United States Patent
Choi et al.

(10) Patent No.: US 9,981,852 B2
(45) Date of Patent: May 29, 2018

(54) SELECTIVE SONICATION-ASSISTED DEPOSITION METHOD OF INORGANIC PARTICLES AND CHA ZEOLITE MEMBRANES GROWN FROM SEEDED LAYERS ON SUBSTRATES USING THE METHOD AND PLATE-LIKE SI-CHA ZEOLITE PARTICLES USED FOR SEED LAYER FORMATION AND MANUFACTURING METHOD OF THE SAME

(71) Applicant: Korea University Research and Business Foundation, Seoul (KR)

(72) Inventors: Jungkyu Choi, Seoul (KR); Eunjoo Kim, Seoul (KR); Wanxi Cai, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 825 days.

(21) Appl. No.: 14/224,258

(22) Filed: Mar. 25, 2014

(65) Prior Publication Data
US 2014/0315709 A1 Oct. 23, 2014

(30) Foreign Application Priority Data
Apr. 22, 2013 (KR) ........................ 10-2013-0044411

(51) Int. Cl.
*B01J 20/18* (2006.01)
*B01J 37/02* (2006.01)
(Continued)

(52) U.S. Cl.
CPC ............... *C01B 39/48* (2013.01); *B01J 20/18* (2013.01); *B01J 20/28033* (2013.01);
(Continued)

(58) Field of Classification Search
CPC .............................. B01J 20/18; B01J 20/3214
See application file for complete search history.

(56) References Cited

U.S. PATENT DOCUMENTS

2014/0315709 A1* 10/2014 Choi ...................... C01B 39/48
502/4

FOREIGN PATENT DOCUMENTS

WO WO 2006/001648 A1 1/2006

OTHER PUBLICATIONS

Peacor, Donald R., et al. "Willhendersonite, a new zeolite isostructural with chabazite." American Mineralogist 69.1-2 (1984): 186-189.

(Continued)

*Primary Examiner* — David M Brunsman
(74) *Attorney, Agent, or Firm* — NSIP Law

(57) ABSTRACT

Provided is a selective sonication-assisted deposition method of inorganic particles and CHA zeolite membranes grown from seeded uniform layers on substrates using the method and plate-like Si-CHA zeolite particles used for seed layer formation and manufacturing method of the same, in which thin inorganic particles may be selectively deposited on a substrate or on a support, and even a physical interaction between the deposited particles and supports (or substrates) alone allows for obtaining high surface coverage to form a uniform layer, which is critical in reproducible production of membranes of inorganic materials, such as zeolite, by secondary growth.

4 Claims, 8 Drawing Sheets

(51) Int. Cl.
*B01J 35/06* (2006.01)
*B01J 29/70* (2006.01)
*B01J 20/32* (2006.01)
*B01J 20/28* (2006.01)
*C01B 39/48* (2006.01)

(52) U.S. Cl.
CPC ..... *B01J 20/28035* (2013.01); *B01J 20/3214* (2013.01); *B01J 20/3238* (2013.01); *B01J 29/7015* (2013.01); *B01J 35/065* (2013.01); *B01J 37/0215* (2013.01); *B01J 2229/26* (2013.01)

(56) References Cited

OTHER PUBLICATIONS

Díaz-Cabañas et al. "Synthesis and structure of pure SiO2 chabazite: the SiO2 polymorph with the lowest framework density." Chemical Communications 17 (1998): 1881-1882.

Kalipcilar, Halil, et al. "Synthesis and separation performance of SSZ-13 zeolite membranes on tubular supports." Chemistry of materials 14.8 (2002): 3458-3464.

Lai et al. "Microstructural optimization of a zeolite membrane for organic vapor separation." Science 300.5618 (2003): 456-460.

Albuquerque, A., et al. "Synthesis of SAPO-34 from the lamellar ALPO-kanemite." Studies in Surface Science and Catalysis 154 (2004): 966-970.

Olson, David H., et al. "Light hydrocarbon sorption properties of pure silica Si-CHA and ITQ-3 and high silica ZSM-58." Microporous and mesoporous materials 67.1 (2004): 27-33.

Lee, J. S., et al. "Ultrasound-Aided Remarkably Fast Assembly of Monolayers of Zeolite Crystals on Glass with a Very High Degree of Lateral Close Packing." Advanced Materials 17.7 (2005): 837-841.

Choi et al. "Uniformity a-Oriented MFI Zeolite Films by Secondary Growth." Angewandte Chemie Int. Ed. 45 (2006): 1154-1158.

Hedin, Niklas, et al. "PFG NMR self-diffusion of small hydrocarbons in high silica DDR, CHA and LTA structures." Microporous and Mesoporous Materials 109.1 (2008): 327-334.

Trzpit, Mickaël, et al. "Pure Silica Chabazite Molecular Spring: A Structural Study on Water Intrusion-Extrusion Processes." The Journal of Physical Chemistry B 112.24 (2008): 7257-7266.

Eilertsen, Einar A., et al. "Single parameter synthesis of high silica CHA zeolite from fluoride media." Microporous and Mesoporous Materials 153 (2012): 94-99.

Kim et al. "Uniform Si-CHA Zeolite Layers Formed by a Selective Sonication-Assisted Deposition Method." Paper Published on Apr. 10, 2013 (25 pages, in English).

Sato, K., et al., "Development of practically available up-scaled high-silica CHA-type zeolite membranes for industrial purpose in dehydration of N-methyl pyrrolidone solution," Journal of Membrane Science, vol. 409-410, 2012, pp. 82-95.

\* cited by examiner

SELECTIVE SONICATION-ASSISTED DEPOSITION METHOD OF INORGANIC PARTICLES AND CHA ZEOLITE MEMBRANES GROWN FROM SEEDED LAYERS ON SUBSTRATES USING THE METHOD AND PLATE-LIKE SI-CHA ZEOLITE PARTICLES USED FOR SEED LAYER FORMATION AND MANUFACTURING METHOD OF THE SAME

CROSS-REFERENCE TO RELATED APPLICATION

This application claims priority from Korean Patent Application No. 10-2013-0044411 filed on Apr. 22, 2013, in the Korean Intellectual Property Office, the entire disclosure of which is incorporated herein by reference for all purposes.

BACKGROUND

1. Field

The following description relates to a selective sonication-assisted deposition method of inorganic particles and chabazite (CHA) zeolite membranes grown from seeded layers on substrates using the method and plate-like all-silica CHA (Si-CHA) zeolite particles used for seed layer formation and manufacturing method of the same, and more particularly, to a selective sonication-assisted deposition method of inorganic particles and CHA zeolite membranes grown from seeded layers on substrates using the method and plate-like Si-CHA zeolite particles used for seed layer formation and manufacturing method of the same, in which thin particles can be selectively deposited on a substrate or on a support, and even a physical interaction alone allows for obtaining high surface coverage to form a uniform layer, which is critical in reproducible production of membranes of inorganic materials, such as zeolite, by secondary growth.

2. Description of Related Art

Zeolites are aluminosilicate crystallines employed in a wide range of applications including catalysis, separation, water softening, and adsorption. The rigid molecular-sized pore structures within zeolites are desirable for use in separations because they allow for the distinguishing and separating of gas molecules based on the difference in their sizes and/or shapes. Thus, this intrinsic molecular sieving property holds promise in selectively isolating $CO_2$ from mixtures, for example, the mixture comprising $CO_2/N_2/H_2O$ that result from the post-combustion processes and the mixture containing $CO_2/CH_4/H_2O$ in the natural gas stream.

Among zeolites, the pore sizes of eight membered rings (MRs) lie in the range suitable for $CO_2$ separation, as they are a little larger than $CO_2$ and smaller than or similar to the sizes of $N_2$ or $CH_4$. Specifically, the molecular sizes (kinetic diameters) of $CO_2$, $N_2$, and $CH_4$ are 0.33 nm, 0.364 nm, and 0.38 nm, respectively, whereas the maximum free dimension of 8 MRs is about 0.43 nm. Multiple 8 MR zeolite membranes have been fabricated in an attempt to capture $CO_2$ from mixtures. Specifically, 8 MR zeolite and zeolite-like membranes such as DDR, SSZ-13 (CHA type) and SAPO-34 (CHA type) membranes have exhibited high performance for $CO_2$ separation. Of these two types, the pore apertures of all-silica CHA (for convenience, referred to as Si-CHA from now on) zeolites are about 0.370 nm×0.417 nm, which enables discrimination of $CO_2$ and $N_2$ by their size difference. Although the separation of $CO_2$ from $N_2$ can be achieved by size exclusion using 8 MR pore apertures, the separation of $CO_2$ from $H_2O$ is more challenging due to the smaller molecular size of $H_2O$ (0.265 nm). In order to minimize $H_2O$ flux through CHA zeolite, hydrophilic properties, presumably due to Al constituents in CHA frameworks should be minimized, requiring all-silica constituents.

Despite the high potential for $CO_2$ separations even in the presence of $H_2O$, to the best of inventors' knowledge, Si-CHA zeolite membranes have not yet been reported. In particular, the uniform formation of a layer (often called a "seed layer") in the secondary growth method is important for attaining continuous CHA films or membranes via subsequent hydrothermal growth. However, it is challenging to synthesize submicrometer-sized and monodispersed Si-CHA zeolite particles, thus hindering the formation of uniform layers and accordingly, continuous films or membranes by secondary growth. The difficulty of the synthesis can be attributed to the inhomogeneous environment in a solid-like precursor in fluoride media, which was known as an effective way to synthesize Si-CHA zeolite up to now (M. J. Diaz-Cabanas, P. A. Barrett, M. A. Camblor, Chem. Commun. 1998, 1881-1882). In addition, a preferential out-of-plane orientation in the seed layer is critical in manufacturing films or membranes with the same orientation, and often improving their separation performance by providing desired pore channels along the film or membrane thickness (Z. Lai, G. Bonilla, I. Diaz, J. G. Nery, K. Sujaoti, M. A. Amat, E. Kokkoli, O. Terasaki, R. W. Thompson, M. Tsapatsis, D. G. Vlachos, Science 2003, 300, 456-460., J. Choi, S. Ghosh, Z. P. Lai, M. Tsapatsis, Angew. Chem., Int. Ed. 2006, 45, 1154-1158).

PRIOR ART DOCUMENTS

Non-patent Documents (Non-patent document 1) M. J. Diaz-Cabanas, P. A. Barrett, M. A. Camblor, Chem. Commun. 1998, 1881-1882.

(Non-patent document 2) Z. Lai, G. Bonilla, I. Diaz, J. G. Nery, K. Sujaoti, M. A. Amat, E. Kokkoli, O. Terasaki, R. W. Thompson, M. Tsapatsis, D. G. Vlachos, Science 2003, 300, 456-460.

(Non-patent document 3) J. Choi, S. Ghosh, Z. P. Lai, M. Tsapatsis, Angew. Chem., Int. Ed. 2006, 45, 1154-1158.

SUMMARY

Provided is a selective sonication-assisted deposition method of inorganic particles and CHA zeolite membranes grown from seeded uniform layers on substrates using the method and plate-like Si-CHA zeolite particles used for seed layer formation and manufacturing method of the same, in which thin particles can be selectively deposited on a substrate or on a support, and even a physical interaction between the deposited particles and supports (or substrates) alone is sufficient to obtain high surface coverage for forming a uniform layer, which is critical in reproducible production of membranes of inorganic materials, such as zeolite, by secondary growth.

Along with the above objective, other objectives of the present invention and the merits thereof will be more apparent with reference to the following disclosure of preferred exemplary embodiments.

According to an exemplary embodiment, provided is a selective sonication-assisted deposition method of inorganic particles, which includes: a first stage of preferentially allowing plate-like inorganic particles to reach a substrate or a support among inorganic particles dispersed with small amounts of plate-like inorganic particles and large amounts of cubic inorganic particles; a second stage of sonication for the reached plate-like inorganic particles to be deposited uniformly on the substrate or support; and a third stage of physical interactions of the uniformly deposited plate-like inorganic particles with the substrate or the support.

The dimensions of the plate-like inorganic particles obey both of the following equations, $$0.01 \leq \frac{z}{x} \leq 0.5 \quad \text{(Equation 1)}$$

$$0.1 \leq \frac{x}{y} \leq 10 \quad \text{(Equation 2)}$$

in which x represents an average length of a particle, y represents an average width of a particle, and z represents an average height of a particle.

The first stage is preferably performed by controlling accessibility to preferentially allow the plate-like inorganic particles to reach the substrate or support through a clearance between the substrate or support and glasses sandwiching the substrate or support.

The substrate or support is preferably plate-like or cylindrical.

The inorganic particles may be CHA particles including Si-CHA particles, metal particles, or metal oxides, and the substrate or support may be silicon, glass, alumina, stainless steel, polymer, metal or metal oxides.

Furthermore, as a CHA zeolite membrane is grown from a uniform seed layer on a substrate obtained using the deposition method described above, the inorganic particles may be CHA particles including Si-CHA particles, metal particles or metal oxides, and the substrate or support is stainless steel, polymer, metal or metal oxide, so that the uniform seed layer comprised of the inorganic particles on the substrate is further intergrown to make continuous CHA membranes or films or membranes via hydrothermal growth.

The hydrothermal growth process for secondary growth is performed in an autoclave of 100° C. to 190° C. for 24 hours or more.

The uniform seed layer on the substrate or support is preferably grown in a solution with a molar composition of 100 $SiO_2$:1-50$Na_2O$:0.1-50$Al_2O_3$:1-50TMAdaOH:1000-10000$H_2O$.

The zeolite membranes preferably go through a calcination step.

The calcination step is preferably carried out at 500° C. to 700° C. for 2 to 24 hours under 100 cc·min$^{-1}$ to 500 cc·min$^{-1}$ air or oxygen flow with a ramp rate of 0.1° C.·min$^{-1}$ to 10° C.·min$^{-1}$.

According to another exemplary embodiment, provided is a method for manufacturing plate-like Si-CHA zeolite particles, which includes: a first process of mixing TMAdaOH (N,N,N-trimethyl-1-adamantanammonium hydroxide) and ethanol with deionized water in a Teflon beaker; a second process of adding tetraethyl orthosilicate to the mixture of the first process; a third process of producing powder by heating to control the molar ratio of $H_2O$ to silica ($SiO_2$) in the mixture of the second process; a fourth process of crushing the produced powder into a fine powder to produce a precursor; a fifth process of adding dropwise hydrofluoric acid to the precursor to produce a synthesis precursor; and a sixth process of thermally reacting the produced synthesis precursor at a high temperature of 150° C. to 190° C. for about 12 to 240 hours to manufacture Si-CHA particles.

The molar composition of the synthesis precursor is preferably 10$SiO_2$:5TMAdaOH:5HF:10-30$H_2O$.

The method preferably further includes an additional mixing process to homogenize the synthesis precursor produced by the fifth process.

The fifth process is preferably performed by adding dropwise hydrofluoric acid to the precursor.

The sixth process of thermal reaction is preferably performed at a temperature of about 155° C. to 190° C.

The method preferably includes a seventh process of calcination of the CHA particles manufactured by the sixth process.

The seventh process of calcination is preferably performed at 500° C. to 700° C. for 2 to 24 hours under 100 cc·min$^{-1}$ to 500 cc·min$^{-1}$ air or oxygen flow with a ramp rate of 0.1° C.·min$^{-1}$ to 10° C.·min$^{-1}$.

Plate-like Si-CHA zeolite particles are manufactured by conducting the above-mentioned seven processes that allow for the reliable synthesis of plate-like Si-CHA zeolite particles along with near cubic Si-CHA zeolite particles.

BRIEF DESCRIPTION OF THE DRAWINGS

Throughout the drawings and the detailed description, unless otherwise described, the same drawing reference numerals will be used to refer to the same elements, features, and structures. The relative size and depiction of these elements may be exaggerated for clarity, illustration, and convenience.

DETAILED DESCRIPTION

Figure 1:
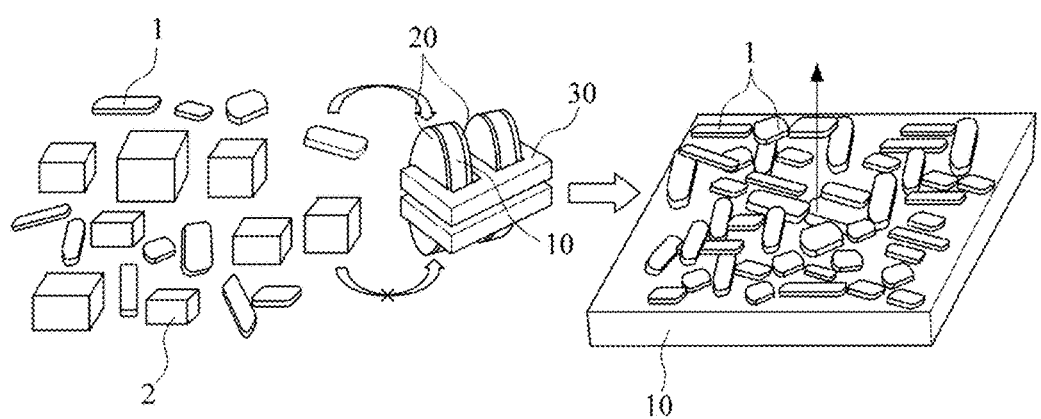
FIG. 1 schematically illustrates a selective sonication-assisted deposition method of inorganic particles according to an exemplary embodiment.

The present disclosure will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

As can be seen in FIG. 1, the selective sonication-assisted deposition method of inorganic particles includes: a first stage of preferentially allowing plate-like inorganic particles to reach a substrate or a support among inorganic particles dispersed with small amounts of plate-like inorganic particles and large amounts of near cubic inorganic particles; a second stage of sonication for the reached plate-like inorganic particles to be deposited uniformly on the substrate or support; and a third stage of physical interactions of the uniformly deposited plate-like inorganic particles with the substrate or the support.

In one exemplary embodiment, uniform, oriented Si-CHA deposits that may serve as good seed layers are achieved. Si-CHA particles are synthesized using a modified version of the conventional synthesis protocol (M. J. Diaz-Cabanas, P. A. Barret, M. A. Camblor, Chem. Commun. 1998, 1881-1882) reported by Camblor and co-workers. As reported, the near cubic (for convenience, hereinafter referred to as "cubic" or "near cubic") Si-CHA particles were observed as the dominant product, although plate-like (for convenience, hereinafter referred to as "plate" or "plate-like") Si-CHA particles were also detected as a minor product. Considering the fact that the shortest dimension perpendicular to the large basal plane in the plate-like Si-CHA particles would be beneficial in forming an oriented layer in the out-of-plane direction, it can be expected to develop a method for depositing only the plate-like Si-CHA particles on a porous α-Al$_2$O$_3$ disc. This would be quite challenging based on conventional coating methods (e.g., dip coating, spin coating, etc.). Despite their relatively low abundance, the plate-like Si-CHA particles were selectively deposited onto the α-Al$_2$O$_3$ disc via a sonication-assisted method and successfully constituted uniform h0h-out-of-plane oriented layers. To avoid any undesired effect, the samples in the form of particles, layers, and films (or membranes) were all calcined.

The wide size distribution (about 1-10 μm) of conventional near cubic Si-CHA zeolites impedes the formation of a uniform layer, which is critical in zeolite film or membrane manufacturing via secondary growth. Plate-like Si-CHA particles, discovered to be co-synthesized as the minor product, were used to constitute a uniform layer. The plate-like Si-CHA zeolite particles, even though present in lower abundance in a mixture with cubic Si-CHA zeolite particles, were selectively deposited on an α-Al$_2$O$_3$ disc, forming a uniform h0h-out-of-plane oriented layer.

Figure 2:
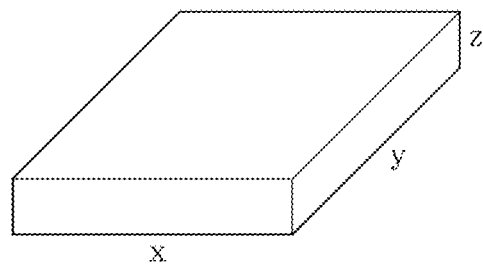
FIG. 2 schematically illustrates an example of a shape of inorganic particles.

Accordingly, it is preferable that the dimensions of the plate-like inorganic particles obey both of the following equations, $$0.01 \leq \frac{z}{x} \leq 0.5 \quad \text{(Equation 1)}$$

$$0.1 \leq \frac{x}{y} \leq 10 \quad \text{(Equation 2)}$$

in which x represents an average length of a particle, y represents an average width of a particle, and z represents an average height of a particle. The parameters are shown in FIG. 2, which schematically illustrate a form of inorganic particles.

In Equation 1, if the value is below 0.01, the effects of the present disclosure are hard to attain, since particles with that aspect ratio would not be formed, or although formed, particles are prone to be broken apart, and are likely to be broken in a random form. If the value is above 0.5, the effects of the present disclosure are also hard to attain, since particles are then similar in form to cubic particles. Furthermore, in Equation 2, if the value is below 0.1, or above 10, a particle form is more like a bar than a plate, such that the effects of the present disclosure cannot be obtained.

The selective sonication-assisted deposition method includes a first stage of preferentially allowing plate-like inorganic particles to reach a substrate or a support among inorganic particles dispersed with small amounts of plate-like inorganic particles and large amounts of cubic inorganic particles. More specifically, the first stage is preferably performed by controlling accessibility to preferentially allow the plate-like inorganic particles to reach the substrate or support through the clearance between the substrate or support and glasses sandwiching the substrate or support. The accessibility varies depending on morphology of inorganic particles, and plate-like particles that satisfy the above Equations 1 and 2 are selectively reached to the substrate or the support. The substrate or support may preferably be plate-like or cylindrical.

Subsequently, a second stage of sonication is performed using a sonicator to deposit the reached plate-like inorganic particles uniformly on the substrate or support.

Lastly performed is a third stage of physical interactions of the uniformly deposited plate-like inorganic particles with the substrate or the support. According to an exemplary embodiment, the above three stages are performed such that seed particles attached to a substrate, e.g. to a surface of α-Al$_2$O$_3$ disc, to form a uniform layer (in the present description, referred to as "uniform seed layer," or a "seed layer") at the same time.

According to an exemplary embodiment, these stages are performed as illustrated in FIG. 1, in such a manner that an α-Al$_2$O$_3$ disc 10, which is a substrate sandwiched by cover glasses 20 and held in place using a Teflon holder 30, is placed in a glass reactor (not shown here) containing Si-CHA particles (a mixture of plate-like particles 1 and cubic particles 2). Next, the glass reactor is sealed with parafilm and placed in a sonicator, and the sealed reactor is sonicated. After that, the seeded α-Al$_2$O$_3$ disc is preferably calcined.

In a preferred exemplary embodiment, the inorganic particles may be Si-CHA particles, metal particles, or metal oxides, and the substrate or support may be silicon, glass, alumina, stainless steel, polymer, metal or metal oxides, and any substrate or support may be used regardless of whether it is porous or non-porous.

Furthermore, as a CHA zeolite membrane is grown from a uniform seed layer on a substrate obtained using the deposition method described above, the inorganic particles may be CHA particles including Si-CHA particles, metal particles or metal oxides, and the substrate or support is silicon, glass, alumina, stainless steel, polymer, metal or metal oxide, so that the uniform seed layer comprised of the inorganic particles on the substrate is further intergrown to make continuous CHA membranes or films via hydrothermal growth.

The uniform seed layer is preferably grown in a solution with a molar composition of 100SiO$_2$:1-50 Na$_2$O:0.1-50Al$_2$O$_3$:1-50 TMAdaOH:1000-10000 H$_2$O.

More specifically, the hydrothermal growth process is performed in an autoclave of 100° C. to 190° C. for 24 hours or more, and the uniform seed layer is reacted in a solution with the molar composition of 100 SiO$_2$:1-50 Na$_2$O:0.1-50 Al$_2$O$_3$:1-50 TMAdaOH:1000-10000 H$_2$O to obtain a final CHA zeolite membrane, and the obtained membrane is preferably calcined in order to avoid any undesired effect. The calcination is preferably carried out at 500° C. to 700° C. for 2 to 24 hours under 100 cc·min$^{-1}$ to 500 cc·min$^{-1}$ air or oxygen flow with a ramp rate of 0.1° C.·min$^{-1}$ to 10° C.·min.

In the above molar composition, the molar ratios of Na$_2$O/SiO$_2$, Al$_2$O$_3$/SiO$_2$, TMAdaOH/SiO$_2$, H$_2$O/SiO$_2$ in the ranges of 0.01-0.5, 0.001-0.5, 0.01-0.5, 10-100, respectively can be employed to synthesize CHA zeolite membranes from CHA seed layers. Below 0.01 for Na$_2$O/SiO$_2$, the concentration of the cation of Na that plays a role of compensating the negative zeolite framework is likely to too low to form CHA zeolites. Above 0.5 for Na2O/SiO2, the concentration of Na cation is in excess given the other fixed components. Below 0.001 for Al$_2$O$_3$/SiO$_2$, the concentration of Al source, which is incorporated with Si into zeolite frameworks, is likely to be too low to form CHA zeolites. Above 0.5 for Al$_2$O$_3$/SiO$_2$, the concentration of Al source is likely to be too high to incorporate well with Si sources and form CHA zeolites. Below 0.01 for TMAdaOH/SiO$_2$, the concentration of TMAdaOH is too low to allow for the amount of CHA zeolites required to get continuous CHA zeolite membranes. Above 0.5 for TMAdaOH/SiO$_2$, the concentration of TMAdaOH is in excess given the other fixed components. Below 10 H$_2$O/SiO$_2$, the concentration of H$_2$O is likely to be too high to provide the homogeneous environment to the involved chemicals and synthesize CHA zeolites. Above 100 H$_2$O/SiO$_2$, the concentration of H$_2$O is likely to be too dilute to generate CHA zeolites enough to form continuous CHA membranes by filling the gap between deposited CHA particles.

Further, according to an exemplary embodiment, the method for manufacturing plate-like Si-CHA zeolite particles includes: a first process of mixing TMAdaOH (N,N, N-trimethyl-1-adamantanammonium hydroxide) and ethanol with deionized water in a Teflon beaker; a second process of adding tetraethyl orthosilicate to the mixture of the first process; a third process of producing powder by heating to control the molar ratio of H$_2$O to silica (SiO$_2$) in the mixture of the second process; a fourth process of crushing the produced powder into a fine powder to produce a precursor; a fifth process of adding dropwise hydrofluoric acid to the precursor to produce a synthesis precursor; and a sixth process of thermally reacting the produced synthesis precursor at a high temperature of 150° C. to 190° C. for about 12 to 240 hours to manufacture Si-CHA particles.

The method preferably includes an additional mixing process to homogenize the synthesis precursor produced by the fifth process. The fifth process is preferably performed by adding dropwise hydrofluoric acid to the precursor, followed by additional mixing after the initial appearance of melting snow, to prepare a synthesis precursor.

Further, the sixth process of thermal reaction is preferably performed at a temperature of about 155° C. to 190° C., and a seventh process of calcination of the CHA particles manufactured by the sixth process may be further included. In order to activate as-synthesized particles and/or avoid any undesired effect, calcination is preferably performed at 500° C. to 700° C. for 2 to 24 hours under 100 cc·min$^{-1}$ to 500 cc·min$^{-1}$ air or oxygen flow with a ramp rate of 0.1° C.·min$^{-1}$ to 10° C.·min$^{-1}$.

The molar composition of the synthesis precursor is preferably 10 SiO$_2$:5 TMAdaOH:5HF:10-30 H$_2$O.

Further, according to an exemplary embodiment, plate-like Si-CHA zeolite particles are manufactured by conducting the above-mentioned method that allows for the reliable synthesis of plate-like Si-CHA zeolite particles along with near cubic Si-CHA zeolite particles.

Hereinafter, configuration and effects of the present invention will be described in further detail with reference to examples and comparative examples, which are used for more specific explanation of the present invention, and thus, the present invention is not limited thereto.

EXAMPLE 1

1. Synthesis of Plate-like Si-CHA Zeolite Particles with a Thin Composition

Si-CHA zeolite particles were synthesized using a modified version of a reported method described in literatures (M. J. Diaz-Cabanas, P. A. Barrett, M. A. Camblor, Chem. Commun. 1998, 1881-1882 (literature 1), and E. A. Eilertsen, B. Arstad, S. Svelle, K. P. Lillerud, Microporous Mesoporous Mater. 2012, 153, 94-99 (literature 2)).

First, N,N,N-trimethyl-1-adamantanammonium hydroxide (TMAdaOH, 25 wt % in H$_2$O, Sachem) and ethanol (200 proof, Sigma-Aldrich) were combined with deionized water in a Teflon beaker. After mixing well, tetraethyl orthosilicate (TEOS, 98% Sigma-Aldrich) was added to the solution. The water was gradually removed by heating the Teflon beaker until the molar ratio of H$_2$O to silica reached about 2.4. At this ratio, the synthesis solution nearly became solid and it was crushed into a fine powder (solid-like precursor) by using a pestle before the addition of hydrofluoric acid (HF). The HF solution (48 wt %, Sigma-Aldrich) was added dropwise to the solid-like precursor in the beaker, followed by additional mixing with a spatula to homogenize the precursor. The prepared synthesis precursor was transferred to a Teflon liner and was reacted at 155° C. under rotation. After a certain time (about 42 h or 64 h), the reaction was quenched with tap water. The synthesized CHA particles were recovered by vacuum filtration and washed with copious deionized water. The final molar composition of the synthesis precursor was 10 SiO$_2$:5 TMAdaOH:5 HF:30 H$_2$O. For convenience, this molar composition is referred to as "Composition t" and corresponds with the thin composition. The resulting CHA particles were calcined for 12 h at 550° C. with the ramp rate of 1° C.·min$^{-1}$ under 200 cc·min$^{-1}$ air or oxygen flow (Pluskolab, model: CRF-M20-UP).

EXAMPLE 2

2. Synthesis of Plate-like Si-CHA Zeolite Particles with a Thick Composition

Example 2 was performed in the same manner as in Example 1, except that the final molar composition of the synthesis precursor was 10 SiO$_2$:5 TMAdaOH:5 HF:10 H$_2$O (the molar ratio of H$_2$O to SiO$_2$ was 1). For convenience, this molar composition is referred to as "Composition T" and corresponds with the thick composition.

Example 3

3. Selective Coating of Plate-like Si-CHA Zeolite Particles on an α-Al$_2$O$_3$ Disc As illustrated in FIG. 1, an α-Al$_2$O$_3$ disc 10, sandwiched by cover glasses 20 and held in place using a custom-made Teflon holder 30, was placed vertically in a glass reactor containing about 0.05 g of dry, calcined CHA particles (a combination of plate-like particles 1 and cubic particles 2). About 40 mL of dry toluene (anhydrous 99.8%, Sigma-Aldrich) was added to the glass reactor. All processes were conducted under an argon environment. Next, the glass reactor was sealed with parafilm and placed in a sonicator (JEIO TECH, UC-10P). The sealed reactor was sonicated for about 20 min. The seeded $\alpha$-$Al_2O_3$ disc was calcined for 4 h at 450° C. with the ramp rate of 1° C.·min$^{-1}$.

Hereinafter, example results will be described in further detail.

Figure 3:
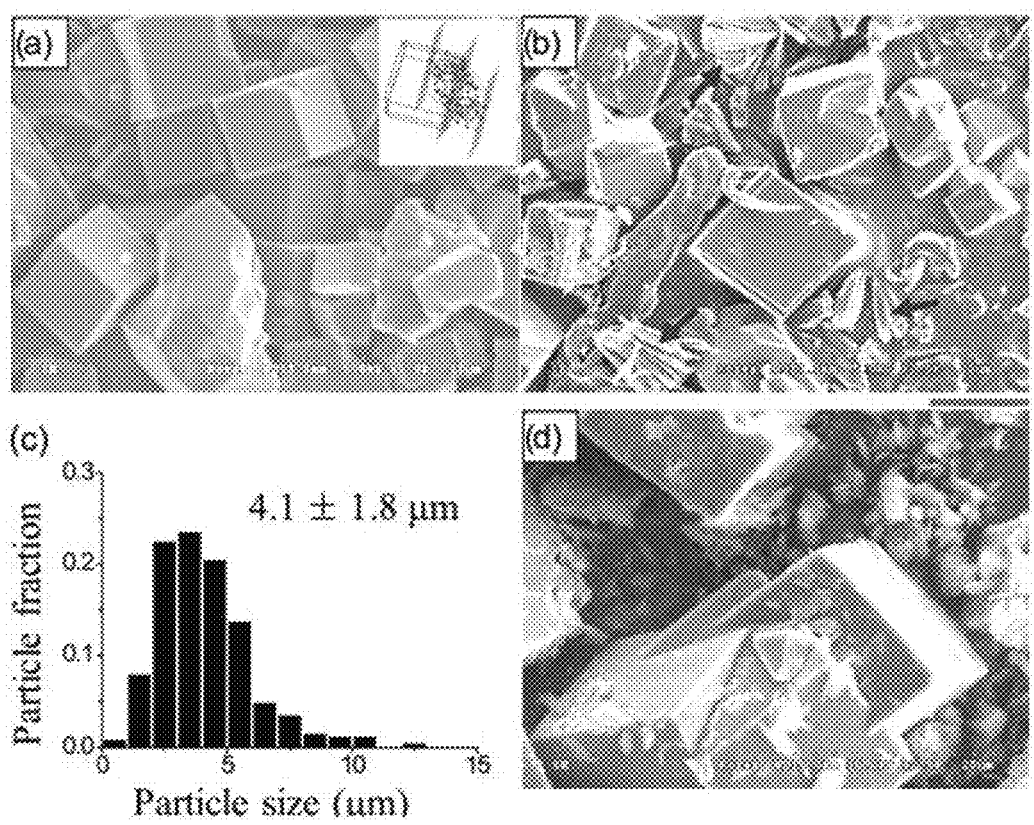
FIG. 3 shows: (a) and (b) SEM images of Si-CHA particles, and (c) the corresponding particle size distribution of near cubic Si-CHA particles according to Example 1; and (d) SEM image of Si-CHA particles according to Example 2.

FIG. 3 shows: (a) and (b) SEM images of Si-CHA particles, and (c) the corresponding particle size distribution of near cubic Si-CHA particles according to Example 1; and (d) SEM image of Si-CHA particles according to Example 2. The scale bars above the SEM images represent 10 μm.

FIG. 3 shows (a) and (b) SEM images of particles synthesized with Composition t (Example 1, 10 $SiO_2$:5 TMAdaOH:5 HF:30 $H_2O$) at 155° C. for 42 hours. Here, arrows indicate the plate-like particles, and the SEM images reveal a majority of near cubic particles that are predicted by the Bravais-Friedel-Donnay-Harker (BFDH) method in Materials Studio (ver. 5.5). The face of near cubic particles denotes a (101) plane. Near cubic particles, which represent the conventional morphology of Si-CHA zeolites, were easily observed in a wide size distribution of about 1 μm to 10 μm. The Bravais-Friedel-Donnay-Harker (BFDH) method suggests that the face of near cubic particles is a (101) plane, as shown in the inset of FIG. 3(a). The morphology of only near cubic Si-CHA particles has been reported in the literature (N. Hedin, G. J. DeMartin, W. J. Roth, K. G. Strohmaier, S. C. Reyes, Microporous Mesoporous Mater. 2008, 109, 327-334., E. A. Eilertsen, B. Arstad, S. Svelle, K. P. Lillerud, Microporous Mesoporous Mater. 2012, 153, 94-99., M. Trzpit, S. Rigolet, J. L. Paillaud, C. Marichal, M. Soulard, J. Patarin, J. Phys. Chem. B 2008, 112, 7257-7266., D. H. Olson, M. A. Camblor, L. A. Villaescusa, G. H. Kuehl, Microporous Mesoporous Mater. 2004, 67, 27-33). However, despite being a minor product, plate-like particles indicated by arrows in FIG. 3(b), which were often observed in an aggregated form, were produced in the present exemplary embodiments. It appears that under the synthetic condition of Composition t, the plate-like particles were concomitantly synthesized along with a majority of near cubic particles. FIG. 3(c) illustrates that the near cubic particles had a wide particle size distribution, comparable to the findings of previous reports. The average particle size and the corresponding standard deviation were 4.1 μm and 1.8 μm, respectively. FIG. 3(d) shows particles (Example 2) synthesized with Composition T, in which the molar ratio of $H_2O$ to $SiO_2$ was changed to about 1, compared to Composition t. The submicrometer thick plate-like particles were more frequently observed along with near cubic particles, the majority product, possibly indicating that the locally reduced water content in Composition t favored CHA particles with plate-like morphology.

Figure 4:
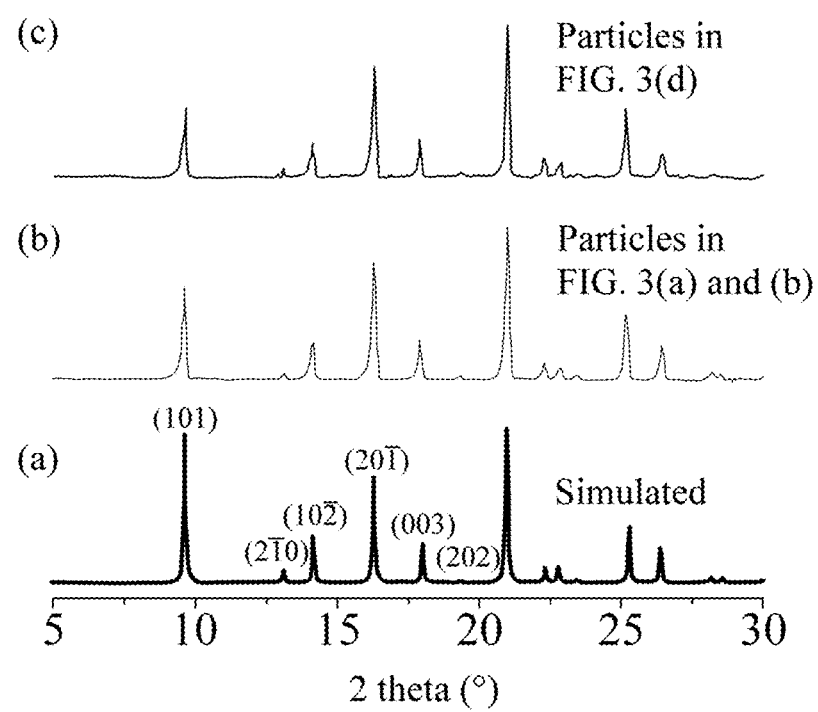
FIG. 4 shows: (a) simulated XRD pattern of Si-CHA zeolite; (b) XRD pattern of the particles shown in FIGS. 3(a) and (b); and (c) XRD pattern of the particles shown in FIG. 3(d).

FIG. 4 shows: (a) simulated XRD pattern of Si-CHA zeolite; (b) XRD pattern of the particles shown in FIG. 3(a) and (b); and (c) XRD pattern of the particles shown in FIG. 3(d). The simulated XRD pattern of as-synthesized Si-CHA zeolite powder was generated via the Mercury Software (Cambridge Crystallographic Data Centre, CCDC), and the corresponding crystal information file (#201658) reported by the Morris group was downloaded via "request a structure" on the CCDC website.

FIG. 4 shows the simulated XRD pattern of powder, and XRD patterns of the synthesized particles shown in FIG. 3. Theses XRD patterns indicated that all particles shown in FIG. 3 were pure Si-CHA zeolites. Considering the near-solid nature of the synthesis precursor, it was possible that the molar composition was inhomogeneous during reaction. Although it was attempted to homogenize the near-solid precursor through an intensive hand-grinding prior to reaction, the molar synthesis composition, especially the $H_2O$/$SiO_2$ ratio, may still have been locally heterogeneous. This means that the 3:1 molar ratio of $H_2O$ to $SiO_2$ in Composition t was likely to be locally decreased, and the decreased ratio promoted the generation of the plate-like morphology of Si-CHA zeolites, as supported by the plate-like particles observed in the synthesis using Composition T (FIG. 3(d)).

The SEM images in FIG. 3 demonstrate the co-existence of the plate-like particles as a minor fraction with near cubic particles. The XRD patterns in FIG. 4 confirm the pure Si-CHA crystal phase of the particles in FIG. 3. However, the XRD patterns in FIG. 4 could be dominated by the more abundant near cubic Si-CHA particles. Therefore, an attempt has been made to isolate the plate-like particles from the larger near cubic particles, on the basis that the latter would precipitate more quickly than the former. The resulting XRD patterns for particles synthesized with Composition t confirmed that the recovered particles predominantly consisted of Si-CHA zeolite phase, although SEM characterization indicated that some near cubic particles still remained. A minor fraction of amorphous particles was also observed. In contrast, the SEM images of particles, recovered by applying the above-mentioned precipitation method to the particles synthesized with Composition T (Example 2), showed that the plate-like Si-CHA particles were more produced.

Subsequently, a more selective method was adopted for characterization of the plate-like particles.

Figure 5:
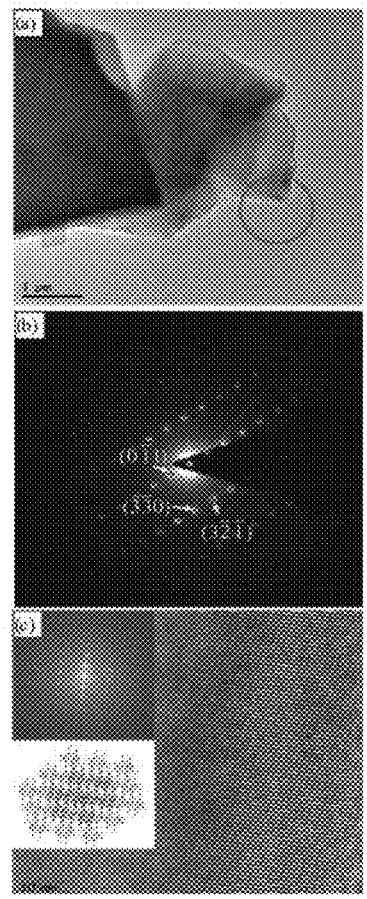
FIG. 5 shows: (a) SEM image; (b) SAED pattern; and (c) HR TEM image, of the plate-like particles found in FIG. 3(b).

FIG. 5 shows: (a) SEM image; (b) SAED pattern; and (c) HR TEM image, of the plate-like particles illustrated in FIG. 3(b). In FIG. 5(b), the simulated SAED pattern marked in red is superposed on the experimental counterpart, and in (c), the FFT result of the HR TEM image and the structural model projected along the [111] zone axis are shown in insets.

An SAED pattern, which was obtained from the marked region in FIG. 5(a), indicated that the plate-like particle was the pure Si-CHA zeolite (FIG. 5(b)). Indexing the spots revealed that the zone axis corresponding to the SAED pattern was [111]. The corresponding simulated SAED pattern marked in red was identical to the experimental counterpart, indicating the validity of the proposed [111] zone axis. FIG. 5(c) shows a HR TEM image of the plate-like particle shown in FIG. 5(a). The FFT result of the HR TEM image in FIG. 5(c) produced a spot pattern similar to the SAED pattern in FIG. 5(b), cross-validating the conclusions made based on the SAED and HR TEM characterizations.

Figure 6:
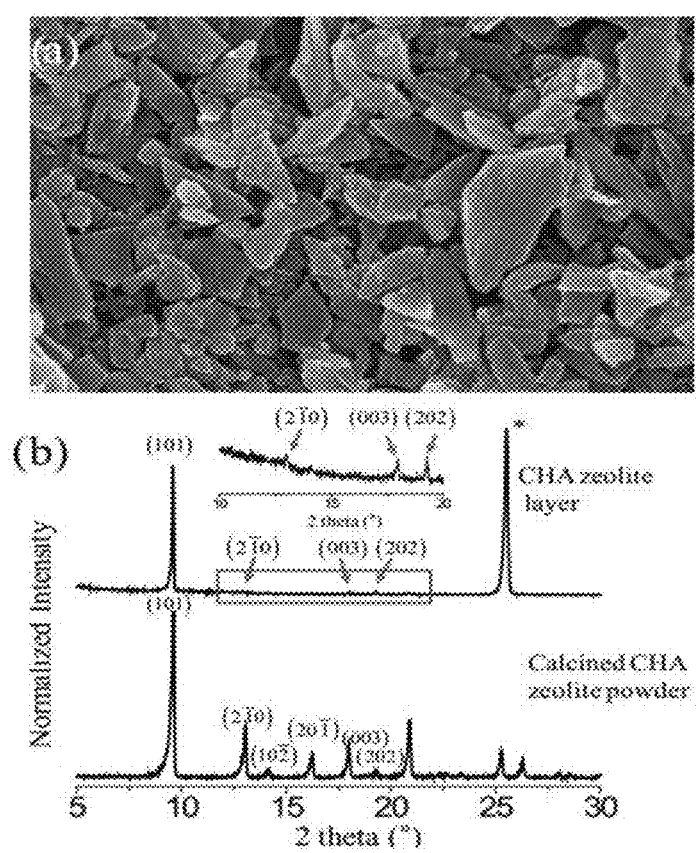
FIG. 6 shows: (a) SEM image of a Si-CHA zeolite layer; and (b) the corresponding XRD pattern along with the XRD pattern of calcined Si-CHA zeolite powder.

FIG. 6 shows: (a) SEM image of a Si-CHA zeolite layer; and (b) the corresponding XRD pattern along with the XRD pattern of calcined Si-CHA zeolite powder. The scale bar in (a) represents 1 μm. The asterisk (*) in (b) indicates the peak from the $\alpha$-$Al_2O_3$ disc.

Figure 7:
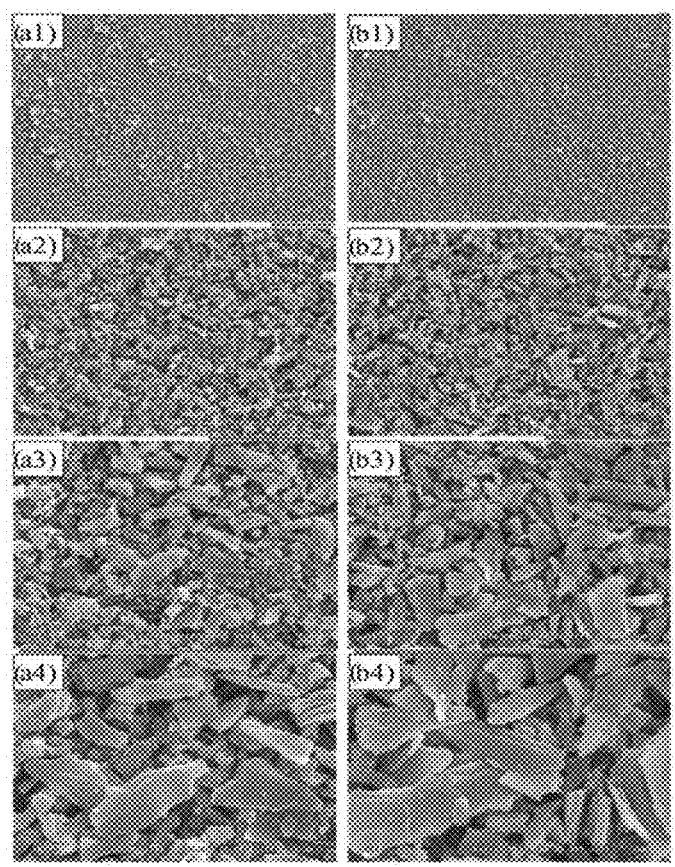
FIG. 7 shows SEM images of Si-CHA zeolite layers taken at two different sites by varying magnifications.

FIG. 6(a) shows a top-view SEM image of a Si-CHA coating layer deposited on an $\alpha$-$Al_2O_3$ disc obtained via the sonication-assisted deposition method. It seems that most of the surface of the $\alpha$-$Al_2O_3$ disc was covered by plate-like Si-CHA particles rather than conventional near cubic particles. It was apparent that the deposited Si-CHA particles were close-packed with multiple layers to some extent. It appears that the access of larger near cubic particles to the disc surface was effectively limited by the clearance between the cover glass and the disc surface, suggesting that limited accessibility was beneficial in selectively coating the α-Al$_2$O$_3$ disc with smaller plate-like particles. Remarkably, even relatively small near cubic particles (1-2 μm) were not deposited either on top of the α-Al$_2$O$_3$ disc or on already-deposited plate-like particles. Also, it is worth mentioning that physical interactions between the plate-like Si-CHA particles and the α-Al$_2$O$_3$ disc were sufficient to form a uniform layer. Therefore, there was no need for any chemical attachment between zeolite particles and the support, constituting a major difference from the sonication-assisted chemical deposition method described in the literature (J. S. Lee, K. Ha, Y. J. Lee, K. B. Yoon, Adv. Mater. 2005, 17, 837-841., K. B. Yoon, J. S. Lee, K. Ha, Y.-J. Lee, Y. Chang (Sogang University), WO 2006/001648 A1, 2006). Additional SEM images taken at two different sites in order of increasing magnification are shown in FIG. 7, in which magnification was increased from (a1) to (a4), and from (b1) to (b4), and the scale bar represents 5 μm. It is possible that a uniform Si-CHA layer with a similar or higher degree of out-of-plane orientation or surface coverage may be formed via the sonication-assisted chemical deposition method described in the literature (J. S. Lee, K. Ha, Y. J. Lee, K. B. Yoon, Adv. Mater. 2005, 17, 837-841., K. B. Yoon, J. S. Lee, K. Ha, Y.-J. Lee, Y. Chang (Sogang University), WO 2006/001648 A1, 2006). However, subsequent calcination, which is supposed to burn off any chemical linkers and promote the condensation of hydroxyl groups between zeolite particles and substrates, made no difference in chemically and physically deposited Si-CHA zeolite particles, given the sufficient uniformity of the Si-CHA zeolite layer. Indeed, the avoidance of a complicated process involving surface functionalization by chemical linkers makes the current approach attractive, since the control of Si-CHA particle accessibility to the substrate suffices to form a uniform Si-CHA layer as shown in FIG. 6(a).

FIG. 6(a) shows that the plate-like particles were deposited with the large plane parallel to the α-Al$_2$O$_3$ disc, thus possibly achieving an out-of-plane orientation. The corresponding XRD pattern shown in FIG. 6(b) confirms that the Si-CHA coating layer was oriented with the h0h-plane perpendicular to the out-of-plane direction. For convenience, the out-of-plane orientation of the Si-CHA layer shown in FIG. 6(a) is referred to as the h0h-out-of-plane orientation. The SEM and XRD characterizations demonstrate that the basal plane in the plate-like Si-CHA particles was the (101) plane and was equivalent to the face of near cubic Si-CHA particles shown in FIG. 3. In addition, the interplanar angle between the plane perpendicular to the [211] zone axis and the (101) plane was about 6.1°, supporting that the basal plane of the plate-like particle, deposited nearly parallel to the surface of the α-Al$_2$O$_3$ disc as shown in FIG. 6a), was the (101) plane. The SAED pattern from the plate-like particle was equivalent to that from the near cubic particle. This indicates that the large basal plane in the plate-like particles can be considered, geometrically speaking, as a slice of the near cubic Si-CHA particles. Though additional work, primarily focusing on investigating Si-CHA crystal growth at the early state, is required, the observation of plate-like Si-CHA particles might indicate a possible growth mechanism in which they are likely to grow by the stacking of their basal planes and to comprise near cubic CHA particles, as lamellar structures in near cubic morphologies were reported for willhendersonite (iso-structural to CHA zeolite) (D. R. Peacor, P. J. Dunn, W. B. Simmons, E. Tillmanns, R. X. Fischer, Am. Mineral. 1984, 69, 186-189.) and for SAPO-34 (obtained via the transformation of lamellar ALPO-kanemite) (A. Albuquerque, S. Coluccia, L. Marchese, H. O. Pastore, Stud. Surf. Sci. Catal. 2004, 154, 966-970.)

Since 8 MR channels (0.370 nm×0.417 nm) run through both a- and b-axes, the 8 MR channels in the direction perpendicular to the h0h-plane is tilted about 47° degree with respect to the a- or b-axis. Accordingly, the tortuosity (defined here as a ratio of the actual path length crossing a film or membrane to the film thickness) across a h0h-oriented CHA film or membrane, if epitaxially well-grown from the uniform h0h-oriented Si-CHA layer, will be about 1.5 with respect to that of either a- or b-oriented counterpart. The crystallographic preferential orientation (CPO) index was further calculated to quantify the preferred out-of-plane orientation. The CPO$_{(101)/(2\bar{1}0)}$ index calculated from three different samples was about 24±8, indicating the pronounced alignment of the h0h-plane in the out-of-plane direction.

EXAMPLE 4

4. Manufacturing CHA Films or Membranes by Secondary Growth

A membrane was manufactured by conducting the secondary growth of the seeded α-Al$_2$O$_3$ disc prepared in Example 3.

Using a solution with the molar composition of 100 SiO$_2$:10 Na$_2$O:2.5 Al$_2$O$_3$:20TMAdaOH:4400H$_2$O, based on a composition described in the literature (H. Kalipcilar, T. C. Bowen, R. D. Noble, J. L. Falconer, Chem. Mater. 2002, 14, 3458-3464), a seeded α-Al$_2$O$_3$ disc was hydrothermally treated in an autoclave at 160° C. for about 2 days. The resulting CHA film or membrane was calcined for 12 h at 550° C. with the ramp rate of 0.5° C.·min$^{-1}$ under 200 cc·min$^{-1}$ air flow (Pluskolab, model: CRF-M20-UP). For secondary growth, CABOSIL fumed silica (Cabot Corporation, M5 grade), aluminum hydroxide (reagent grade, Sigma-Aldrich), and sodium hydroxide (99% pellets, Sigma-Aldrich) were used as Si, Al, and Na sources, respectively.

Considering that the deposits in the seed layer in Example 3 possibly contained amorphous flakes, the secondary growth of the seed layer was attempted to inter-grow the layer in FIG. 6a with the synthesis condition that leads to SSZ-13 zeolites (CHA type).

Figure 8:
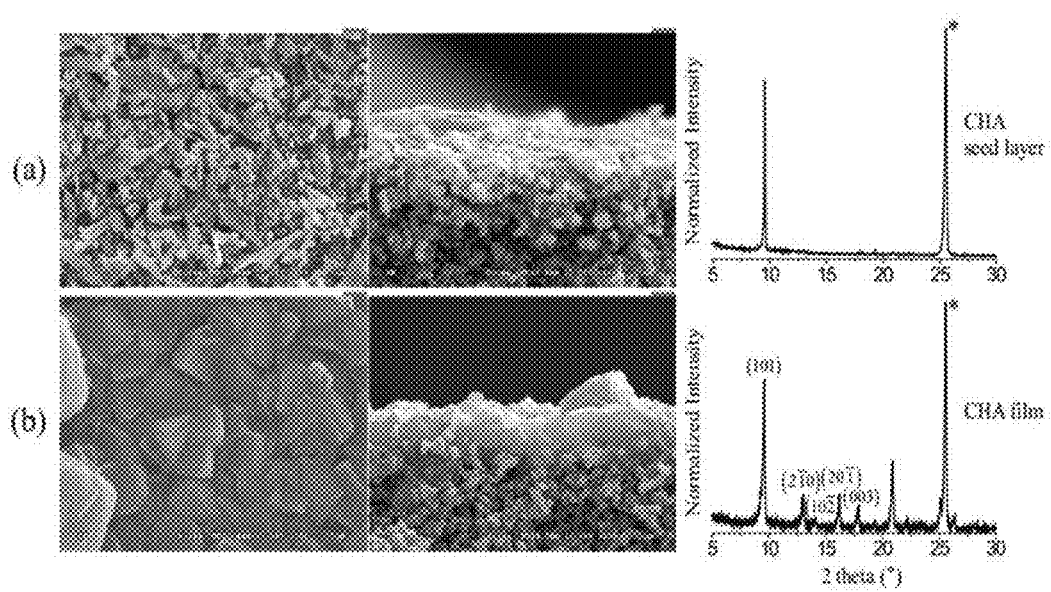
FIG. 8 illustrates: (a) top view and cross-sectional view SEM images, and the corresponding XRD pattern, of a Si-CHA seed layer; and (b) top view and cross-sectional view SEM images, and the corresponding XRD pattern, of a CHA film or membrane obtained via secondary growth of the Si-CHA seed layer shown in (a).

FIG. 8 shows results of a Si-CHA seed layer acquired from Example 3 and of a membrane manufactured by conducting the secondary growth of the seeded α-Al$_2$O$_3$ disc obtained in Example 3. Here, FIG. 8(a) shows top view and cross-sectional view SEM images of a Si-CHA seed layer along with its XRD pattern; and FIG. 8(b) shows top view and cross-sectional view SEM images, and the corresponding XRD pattern of a CHA film or membrane obtained via secondary growth of the Si-CHA seed layer shown in (a). The scale bar above the SEM images represents 1 μm, and the asterisk (*) in the XRD patterns indicates the peak from the α-Al$_2$O$_3$ disc. The top view and cross-sectional view SEM images in FIG. 8 reveal that despite the possible presence of amorphous constituents, the secondary growth of the compact seed layer resulted in a continuous CHA film or membrane with a thickness of about 1.5 μm to 2 μm. However, the h0h-out-of-plane orientation achieved in the seed layer was not well preserved during secondary growth, indicating the need of additional work on tracing the evolution in out-of-plane orientation with the film thickness in order to understand the growth behavior of CHA films.

In summary, it was possible to selectively deposit the plate-like CHA particles, even though present in lower abundance in a mixture with near cubic CHA particles, on the porous α-Al$_2$O$_3$ disc, forming a uniform h0h-out-of-plane oriented Si-CHA layer. The successful formation of this layer was attributed to two main factors: (1) sonication allowed dispersed Si-CHA particles to reach the surface of the α-Al$_2$O$_3$ disc and to physically deposit on the surface while forming a continuous layer; and (2) cover glasses sandwiching the α-Al$_2$O$_3$ disc permitted only smaller plate-like Si-CHA particles to reach the surface, preventing access to the more abundant and larger near cubic particles. Controlling accessibility allowed the depositing of thinner particles while excluding thicker ones, which is otherwise quite challenging due to the difficulty in separating mixed solids with different morphologies and sizes. Given a Si-CHA zeolite film or membrane with a thickness of 1 μm or below on a tubular support (e.g., 1 cm in diameter and 10 cm in length), the resulting CHA film or membrane would gain 5 mg or less, as only a small quantity of particles is sufficient to cover the entire surface area. Thus, the sonication-assisted deposition method can be regarded as an effective tool for forming a uniform layer, even when the desired particles exist as a minor fraction. The h0h-oriented layer is a good candidate for oriented film or membrane manufacturing via subsequent epitaxial secondary growth and the effort to synthesize h0h-oriented continuous CHA films or membranes is underway.

Further, as the cost for capturing CO$_2$ amounts to almost 70% of the total costs in the field of CO$_2$ capture and removal, using membranes for capturing CO$_2$ is an important technology. Accordingly, modulation of inorganic membranes, such as CO$_2$ selective zeolite membrane, according to the present disclosure may allow membranes to be used for production, storage, and loading and unloading of CO$_2$.

As mentioned above, based on the developed technology, plate-like particles can be selectively deposited on a substrate or a support and a physical interaction is sufficient to obtain high surface coverage of the deposited particles, providing a uniform seed layer and accommodating the reproducible production of inorganic membranes such as zeolite membranes via the secondary growth of the seed layer.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. A method of selective sonication-assisted deposition, comprising:
   allowing plate shaped inorganic particles, dispersed among cubic inorganic particles, to reach a substrate through a clearance between the substrate and glasses sandwiching the substrate, wherein an amount of the plate-shaped inorganic particles is smaller than an amount of the cubic inorganic particles; and
   performing sonication on the plate-shaped inorganic particles which reached the substrate to uniformly deposit the plate-shaped inorganic particles on the substrate.

2. The method of claim 1, wherein dimensions of the plate-shaped inorganic particles conform to the equations:

$$0.01 \leq \frac{z}{x} \leq 0.5$$

$$0.1 \leq \frac{x}{y} \leq 10,$$

where x is an average length of a particle among the plate-shaped inorganic particles, y is an average width of the particle, and z is an average height of the particle.

3. The method of claim 1, wherein the substrate is plate-shaped or cylindrical.

4. The method of claim 1, wherein the inorganic particles are CHA particles comprising Si-CHA particles, metal particles, or metal oxides, and the substrate comprises silicon, glass, alumina, stainless steel, polymer, metal, or a metal oxide.

* * * * *